United States Patent
Chen et al.

(10) Patent No.: US 9,164,305 B2
(45) Date of Patent: Oct. 20, 2015

(54) LIQUID-CRYSTAL PANEL AND THE UV CURING METHOD THEREOF

(71) Applicant: INNOLUX CORPORATION, Miao-Li County (TW)

(72) Inventors: Yu-Wei Chen, Miao-Li County (TW); Pi-Ying Chuang, Miao-Li County (TW); Chien-Hung Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 219 days.

(21) Appl. No.: 13/934,443

(22) Filed: Jul. 3, 2013

(65) Prior Publication Data

US 2014/0028960 A1    Jan. 30, 2014

(30) Foreign Application Priority Data

Jul. 24, 2012    (TW) .............. 101126641 A

(51) Int. Cl.
*G02F 1/1333* (2006.01)
*G02F 1/1335* (2006.01)
*G02F 1/1337* (2006.01)
*G02F 1/137* (2006.01)

(52) U.S. Cl.
CPC .......... *G02F 1/13336* (2013.01); *G02F 1/1333* (2013.01); *G02F 1/1335* (2013.01); *G02F 1/133504* (2013.01); *G02F 1/133509* (2013.01); *G02F 1/133514* (2013.01); *G02F 1/133707* (2013.01); *G02F 2001/13775* (2013.01); *G02F 2001/13793* (2013.01); *G02F 2202/023* (2013.01)

(58) Field of Classification Search
CPC ............ C09K 19/0275; H01L 33/0095; H01L 27/1285; G02F 2001/13793; G02F 2001/13775; G02F 1/1333; G02F 1/133365; G02F 1/1334; G02F 1/133504; G02F 1/133514; G02F 1/133526; G02F 1/133553; G02F 1/133617; G02F 1/136; G02F 1/133707; G02F 1/1343; G09G 2320/0252; B32B 2038/0076; B32B 2310/0831; B32B 2457/202
USPC ......... 349/182, 183, 187, 185, 191, 202, 139, 349/141, 175, 86, 106, 43, 112, 113, 93, 95, 349/64
See application file for complete search history.

(56) References Cited

U.S. PATENT DOCUMENTS 7,372,535 B2 * 5/2008 Tashiro et al. ................ 349/187
2011/0157538 A1 * 6/2011 Lee ............................... 349/190

* cited by examiner

*Primary Examiner* — Thoi Duong
(74) *Attorney, Agent, or Firm* — WPAT, PC; Justin King

(57) ABSTRACT

This disclosure provides a LC panel and the UV curing method therein for the LC curing treatment. The LC panel includes: a first substrate with a plurality of protrusion electrodes formed thereon; a second substrate disposed on the first substrate; a LC layer interposed between the first and second substrates; and a deflecting structure disposed between the first and second substrates and configured for changing optical paths of UV light; wherein the UV light passes through the areas between the neighboring protrusion electrodes, and the deflecting structure is located in the optical paths of the UV light.

12 Claims, 6 Drawing Sheets

US 9,164,305 B2

LIQUID-CRYSTAL PANEL AND THE UV CURING METHOD THEREOF

This application claims the benefit of Taiwan application Serial No. 101126641, filed Jul. 24, 2012, the disclosure of which is incorporated by reference herein in its entirety.

TECHNICAL FIELD

The present disclosure relates to the field of liquid crystal (LC) panel, and more particularly, to a method for spreading ultra-violet (UV) exposure in a blue-phase LC panel for the curing treatment.

TECHNICAL BACKGROUND

Blue phases are liquid crystal phases that appear in the between a chiral nematic phase and an isotropic liquid phase. Blue-phase LC has been applied to the LC display manufacturing due to its fast response and no need in rubbed alignment. However, such kind of LC operates in the blue phase mode and exhibits its advantages only over a quite limited temperature range. To solve the problem, some monomers can be added to the blue-phase LC, and the mixture is exposed to UV light for the curing treatment. This is the so-called polymer-stabilized blue phase (PSBP) LC, which may extend the temperature range of blue-phase mode.

Regarding the above-mentioned UV curing treatment, if a LC panel of the display has protrusion-typed electrodes, the UV exposure may be shielded and affected by the electrodes. The uneven exposure can lower the stability and uniformity of LC polymerization and diversify LC electro-optic characteristics, such as hysteresis and residual birefringence, in the blue-phase LC cell. This may at least causes the fact that the dark-state performance of the blue-phase LC display would be deteriorated. Consequently, it is in need to develop a new method for curing LC in the blue-phase LC display, which can provide a much uniform UV exposure, so as to improve the polymerization stability and electro-optic characteristics of the blue-phase LC.

TECHNICAL SUMMARY

According to one aspect of the present disclosure, one embodiment provides a LC panel, which includes: a first substrate with a plurality of protrusion electrodes formed thereon; a second substrate disposed on the first substrate; a LC layer interposed between the first and second substrates; and a deflecting structure disposed between the first and second substrates and configured for changing optical paths of UV light; wherein the UV light passes through the intermediate areas between the neighboring protrusion electrodes, and the deflecting structure is located in the optical paths of the UV light.

According to another aspect of the present disclosure, another embodiment provides a LC display apparatus, which includes a LC panel having a first substrate with a plurality of protrusion electrodes formed thereon; a second substrate disposed on the first substrate; a LC layer interposed between the first and second substrates; and a deflecting structure disposed between the first and second substrates and configured for changing optical paths of UV light; wherein the UV light passes through the intermediate areas between the neighboring protrusion electrodes, and the deflecting structure is located in the optical paths of the UV light.

According to another aspect of the present disclosure, another embodiment provides a method for spreading UV exposure in a LC panel for LC curing treatment, the method including the steps of: providing a LC panel which comprises a first substrate with a plurality of protrusion electrodes formed thereon, a second substrate disposed on the first substrate, and a LC layer interposed between the first and second substrates; exposing the LC panel to UV light which travels upwards; and changing optical paths of the UV light; wherein the UV light travels through the intermediate areas between the neighboring protrusion electrodes.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following. Reference will now be made in detail to the preferred embodiments, examples of which are illustrated in the accompanying drawings.

In the following description of the embodiments, it is to be understood that when an element such as a layer (film), region, pattern, or structure is stated as being "on" or "under" another element, it can be "directly" on or under another element or can be "indirectly" formed such that an intervening element is also present. Also, the terms such as "on" or "under" should be understood on the basis of the drawings, and they may be used herein to represent the relationship of one element to another element as illustrated in the figures. It will be understood that this expression is intended to encompass different orientations of the elements in addition to the orientation depicted in the figures, namely, to encompass both "on" and "under". In addition, although the terms "first", "second" and "third" are used to describe various elements, these elements should not be limited by the term. Also, unless otherwise defined, all terms are intended to have the same meaning as commonly understood by one of ordinary skill in the art.

Figure 1:
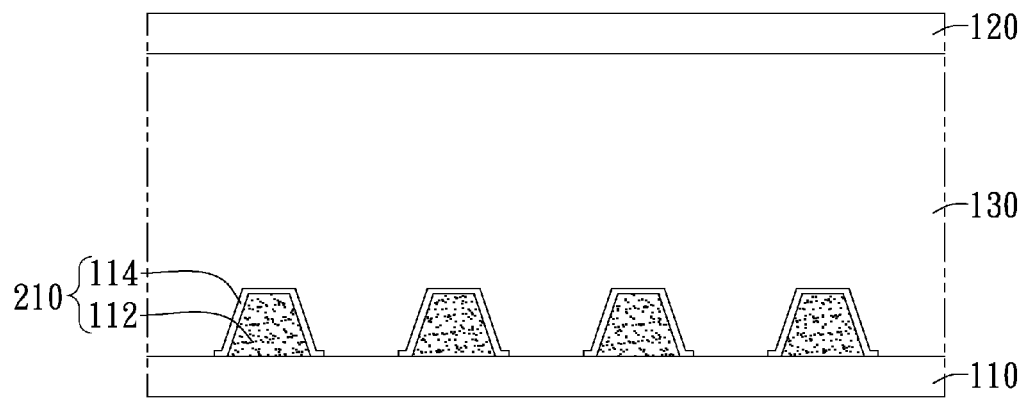
FIG. 1 schematically shows a cross-sectional view of a LC panel according to one embodiment of the present disclosure.

FIG. 1 schematically shows a cross-sectional view of a LC panel 100 according to one embodiment of the present disclosure. The LC panel 100 can be applied to the blue-phase LC display having protrusion-typed electrodes, which can be the electrodes of the in-plane-switching (IPS) panel, vertical-field-switching panel, or the other types of LC panel. Electrode layouts on two glass plates of the above-mentioned IPS panel can be symmetric or asymmetric to each other. As shown in FIG. 1, the LC panel 100 includes a first substrate 110, a second substrate 120, and a blue-phase LC layer 130. The first substrate 110 can be a thin-film-transistor (TFT) substrate or a TFT substrate with color filter array, and the second substrate 120 can be a color filter (CF) substrate. If a LC display is operated according to the field-sequential color system, it does not require the above mentioned CF in the panel. The blue-phase LC layer 130 is filled with blue-phase LC molecules (not shown) and monomers (not shown) in the cell between the first substrate 110 and the second substrate 120 before exposed to and cured by ultraviolet (UV) light. A plurality of discrete protrusions 112 are formed on the first substrate 110. A plurality of electrodes 114 are also formed on the first substrate 110, each covering one of the protrusions 112. The electrode 114 may have an extension part extending from the edge of the protrusion 112 and directly on the first substrate 110. In another embodiment, the protrusions 112 can be made of electrical conductor material, or both the protrusions 112 and the electrodes 114 can be made of the same conductive material. Moreover, the protrusions 112 can be formed in a single layer or in a stack of layers. Each combination of protrusion 112 and electrode 114 can be referred to as a protrusion electrode 210. The protrusion electrode 210 may have a cross-section in the shape of a semicircle, triangle, trapezoid, or polygon; but is not limited thereto, it can have a T-shaped or stepped cross-section. The protrusion electrodes 210 can be formed either on the first substrate 110 or on the second substrate 120, or the protrusion electrodes 210 can be formed on both the first substrate 110 and the second substrate 120.

Blue-phase LC can be polymer-stabilized to increase its temperature range of blue phases by UV exposure. The LC panel 100 can be exposed to UV light, causing the curing reaction between the blue-phase LC molecules and the monomers in the blue-phase LC layer 130. In one embodiment, a UV light source can be disposed under the first substrate 110 and the UV light enters upwards into the blue-phase LC layer 130. In another embodiment, a UV light source can be disposed above the second substrate 120 and the UV light enters downwards into the blue-phase LC layer 130. The protrusions 112 and/or the electrodes 114 on the substrate 110/120 may obstruct a part of the UV light, causing an uneven UV exposure in the blue-phase LC layer 130. The evenness of UV exposure in the blue-phase LC layer 130 may further deteriorate if there are various color filters on the substrate 110/120. Therefore, the blue-phase LC molecules and monomers in some areas of the blue-phase LC layer 130 blocked from the UV light cannot be polymer-stabilized and thus cured well, causing the blue-phase LC display to exhibit a not good performance.

In the present disclosure, a deflecting structure is further disposed in the LC panel 100 as shown in FIG. 1, so as to change optical paths of the UV light. For example, the deflecting structure can be disposed between the first substrate 110 and the second substrate 120. The UV light may pass by the deflecting structure (that is, the deflecting structure is located in the optical paths of the UV light), so that UV exposure and UV curing in the blue-phase LC layer 130 can be much uniform. Several embodiments will be described in detail below. Various types of deflecting structures are respectively added into the LC panel 100 to let the blue-phase LC layer 130 be exposed to the UV light uniformly, and thus to improve the curing treatment and polymer-stabilized state of the blue-phase LC. The deflecting structure may deflect an incident light according to a scattering, refracting, reflecting or other effect.

Figure 2:
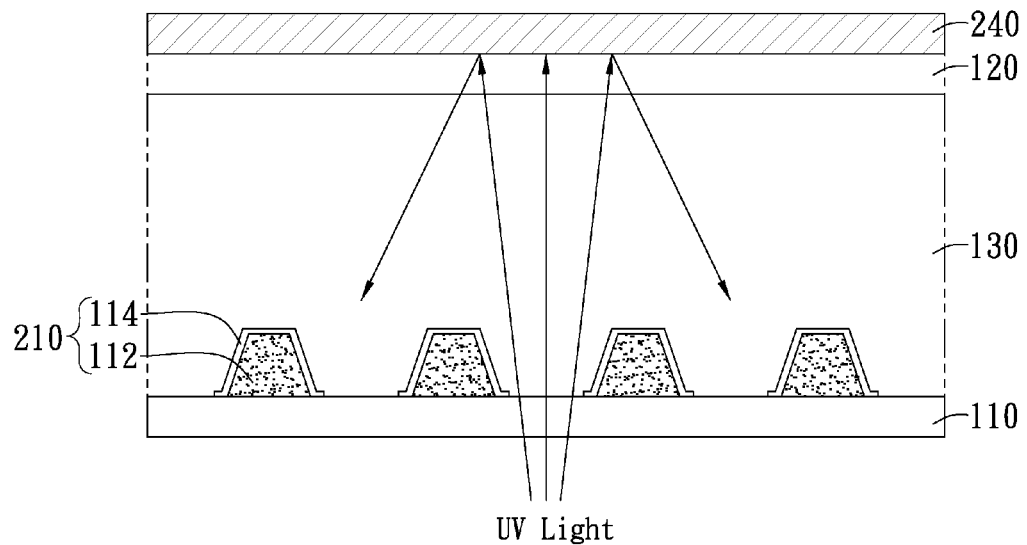
FIG. 2 schematically shows a cross-sectional view of a blue-phase LC panel according to a first example of the embodiment.

FIG. 2 schematically shows a cross-sectional view of a blue-phase LC panel 200 according to a first example of the embodiment. A protrusion 112 and an electrode 114 can be combined to become a protrusion electrode 210. The protrusions 112 can be made of electrical conductor material, or both the protrusions 112 and the electrodes 114 can be made of the same conductive material. As shown in FIG. 2, the LC panel 200 includes a reflective sheet 240 other than the LC panel 100 in FIG. 1. The reflective sheet 240 is disposed on the second substrate 120 to realize the above-mentioned deflecting structure. The reflective sheet 240 can reflect an incident UV light. If a UV light source is disposed under the LC panel 200, the UV light can enter upwards from the first substrate 110 into the blue-phase LC layer 130. The reflective sheet 240 reflects the UV light which has passed through the LC panel 200 back to the LC panel 200, so that the blue-phase LC layer 130 can be exposed to the UV light again. Due to the reflective sheet 240, the blue-phase LC layer 130 receives a more UV exposure in both frequency and extent, so that the blue-phase LC layer 130 can be exposed to the UV light in a more uniform manner for the LC curing treatment. The reflective sheet 240 can be temporarily placed on the second substrate 120, and be removed from the second substrate 120 after the UV exposure. But is not limited thereto, the reflective sheet 240 can be formed in the form of a mirror film under the second substrate 120 in another embodiment. In other words, the deflecting structure can be formed on the side surface of the second substrate 120 which is the closest to the first substrate 110. Preferably, the mirror film can reflect UV light but transmit visible light.

Figure 3:
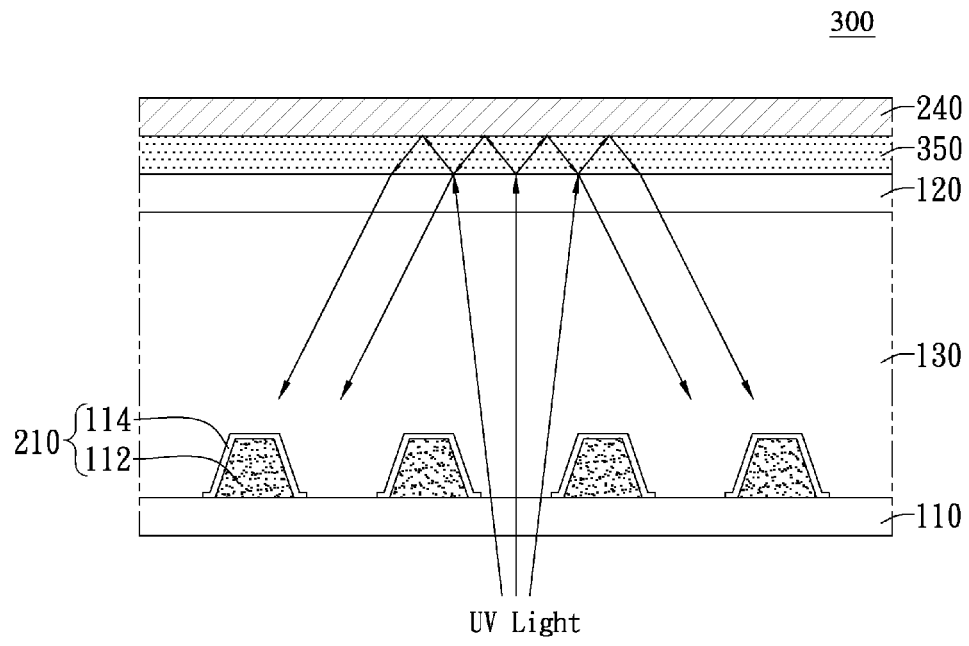
FIG. 3 schematically shows a cross-sectional view of a blue-phase LC panel according to a second example of the embodiment.

FIG. 3 schematically shows a cross-sectional view of a blue-phase LC panel 300 according to a second example of the embodiment. The LC panel 300 includes a diffusion plate 350 other than the LC panel 200 in FIG. 2. The diffusion plate 350 is interposed between the reflective sheet 240 and the second substrate 120, and configured for diffuse an incident UV light. In the example, the reflective sheet 240 and the diffusion plate 350 are combined to serve as the above-mentioned deflecting structure. As shown in FIG. 3, if a UV light source is disposed under the LC panel 300, the UV light can enter upwards from the first substrate 110 into the blue-phase LC layer 130. The diffusion plate 350 deflects or diffuses the UV light which has passed through the LC panel 300 to change its optical direction. The diffused UV light is then reflected by the reflective sheet 240 back to the diffusion plate 350, and is diffused by the diffusion plate 350 again. The re-diffused UV light then goes back to the LC panel 300, so that the blue-phase LC layer 130 can be exposed to the UV light once more. Due to the reflective sheet 240 and the diffusion plate 350, the blue-phase LC layer 130 receives a more UV exposure in both frequency and extent, so that the blue-phase LC layer 130 can be exposed to the UV light in a more uniform manner for the LC curing treatment. The reflective sheet 240 and/or the diffusion plate 350 can be temporarily placed on the second substrate 120, and be removed from the second substrate 120 after the UV exposure. But it is not limited thereto, the reflective sheet 240 and/or the diffusion plate 350 can be formed on the lower surface of the second substrate 120 in the form of diffusion films according to another embodiment. In other words, the deflecting structure can be formed on the side surface of the second substrate 120 which is the closest to the first substrate 110. Preferably, the diffusion film can reflect or diffuse UV light but transmit visible light. Moreover, a mirror with diffusing function or scattering structure can also be used to realize the deflecting structure in this example.

Figure 4:
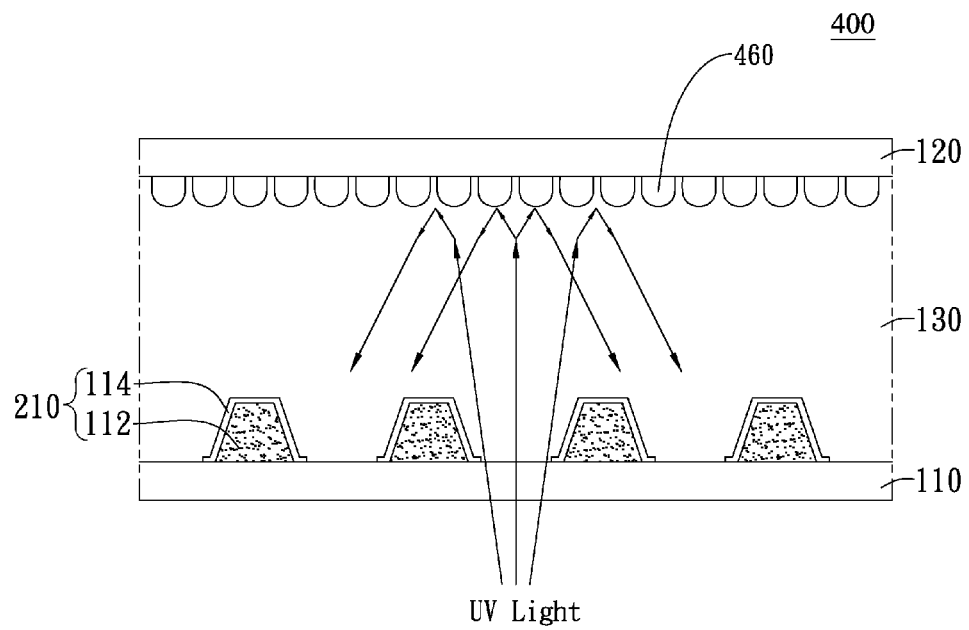
FIG. 4 schematically shows a cross-sectional view of a blue-phase LC panel according to a third example of the embodiment.

FIG. 4 schematically shows a cross-sectional view of a blue-phase LC panel 400 according to a third example of the embodiment. A protrusion 112 and an electrode 114 can be combined to serve as a protrusion electrode 210. The LC panel 400 includes a plurality of micro-structures 460 other than the LC panel 100 in FIG. 1. The micro-structures 460 are disposed on the lower surface of the second substrate 120 to realize the above-mentioned deflecting structure. The micro-structures 460 can transmit an incident visible light and reflect or deflect an incident UV light. In other words, the micro-structures 460 act as an optical filter to transmit visible light and reflect or deflect UV light. Each micro-structure 460 can have a cross-sectional shape of semi-circle, triangle or polygon; but it is not limited thereto, the micro-structures 460 can be shaped and patterned in the other proper manner. FIG. 4 shows an exemplary design for the micro-structures 460. Thereby, if a UV light source is disposed under the LC panel 400, the UV light can enter upwards from the first substrate 110 into the blue-phase LC layer 130. The micro-structures 460 deflects and then reflects the UV light which has passed through the blue-phase LC layer 130 back to the blue-phase LC layer 130, so that the blue-phase LC layer 130 can be exposed to the UV light again. Due to the micro-structures 460, the blue-phase LC layer 130 receives a more UV exposure in both frequency and extent, so that the blue-phase LC layer 130 can be exposed to the UV light in a more uniform manner for the LC curing treatment. Because the micro-structures 460 transmit visible light but only reflect or deflect UV light, no observable impact would be induced on the image performance of the LC panel 400 even if the micro-structures 460 are disposed inside the LC panel 400. In another embodiment, the micro-structures 460 can be formed in the form of a roughness film under the second substrate 120.

Figure 5:
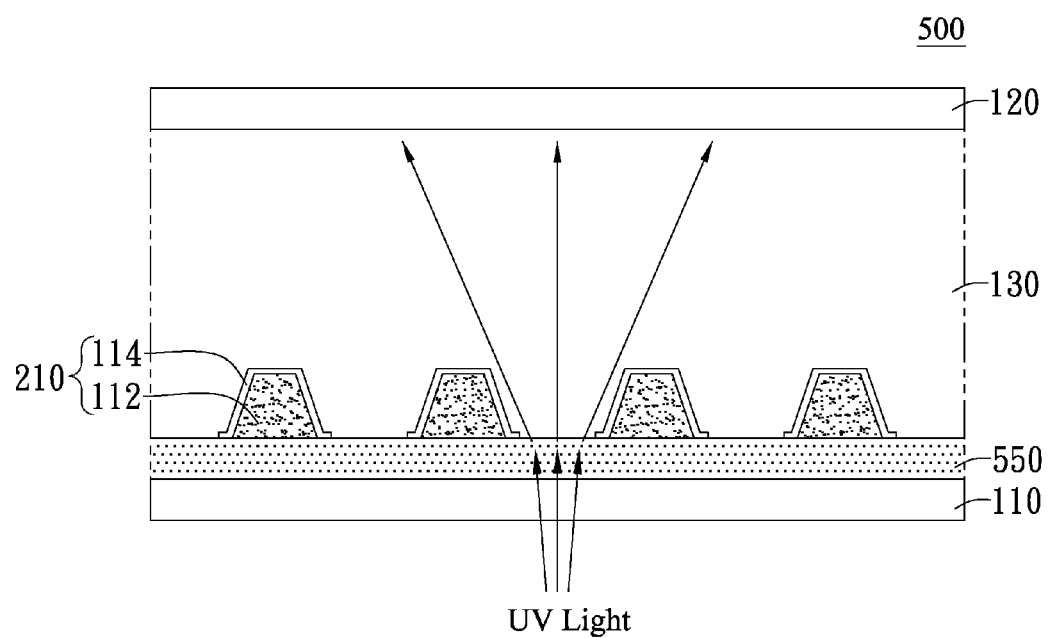
FIG. 5 schematically shows a cross-sectional view of a blue-phase LC panel according to a fourth example of the embodiment.

FIG. 5 schematically shows a cross-sectional view of a blue-phase LC panel 500 according to a fourth example of the embodiment. A protrusion 112 and an electrode 114 can be combined to serve as a protrusion electrode 210. As shown in FIG. 5, the LC panel 500 includes a diffusion film 550 other than the LC panel 100 in FIG. 1. The diffusion film 550 is interposed between the protrusion electrodes 210 and the first substrate 110 to realize the above-mentioned deflecting structure. The diffusion film 550 can deflect or diffuse an incident UV light. Thereby, if a UV light source is disposed under the LC panel 500, the UV light can enter upwards from the first substrate 110 into the blue-phase LC layer 130. The diffusion film 550 deflects or diffuses the UV light which has passed through the first substrate 110, so that the blue-phase LC layer 130 can be extensively exposed to the UV light. Due to the diffusion film 550, the blue-phase LC layer 130 receives a more UV exposure in extent, so that the blue-phase LC layer 130 can be uniformly exposed to the UV light for the LC curing treatment.

Figure 6A:
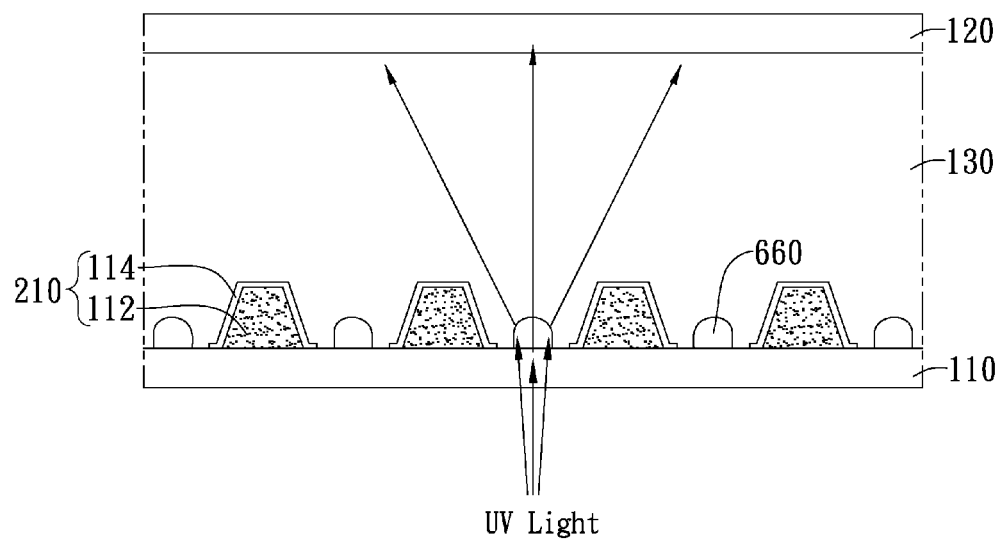
FIGS. 6A and 6B schematically shows cross-sectional views of a blue-phase LC panel according to a fifth example of the embodiment.
Figure 6B:
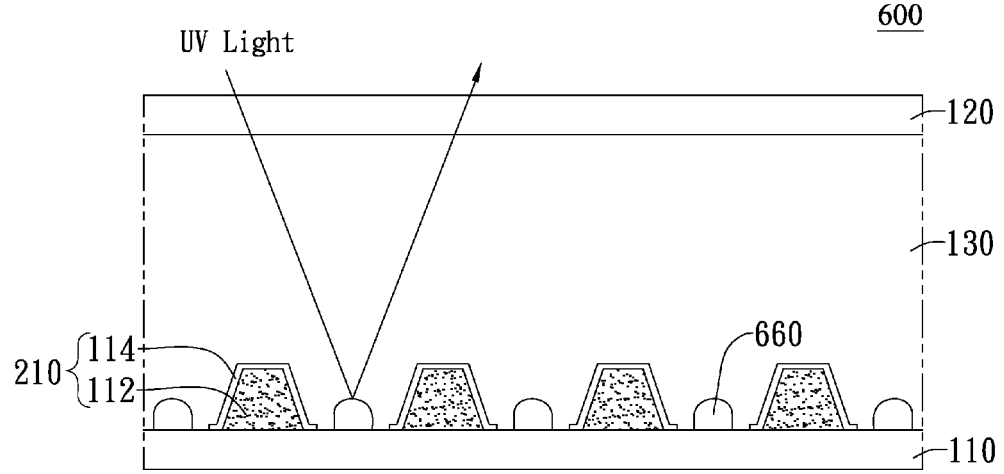

FIG. 6A schematically shows a cross-sectional view of a blue-phase LC panel 600 according to a fifth example of the embodiment. A protrusion 112 and an electrode 114 can be combined to serve as a protrusion electrode 210. As shown in FIG. 6A, the LC panel 600 includes a plurality of scattering members 660 other than the LC panel 100 in FIG. 1. The scattering members 660 are disposed on the first substrate 110, each scattering member 660 located in the intermediate area between the neighboring protrusion electrodes 210, to realize the above-mentioned deflecting structure. In other words, an alternate arrangement of one protrusion electrode 210 by one scattering member 660 is formed on the upper surface of the first substrate 110. If we look down at the first substrate 110, it can be observed that the protrusion electrodes 210 are located at the area between two neighboring protrusion electrodes 210. The scattering members 660 can deflect or scatter an incident UV light. The scattering members 660 can cover only a part of the intermediate area between the neighboring protrusion electrodes 210; they are not required to cover the whole intermediate area between the neighboring protrusion electrodes 210. Thereby, if a UV light source is disposed under the LC panel 600, the UV light can enter upwards from the first substrate 110 into the blue-phase LC layer 130. The scattering members 660 deflect or scatter the UV light which has passed through the first substrate 110, so that the blue-phase LC layer 130 can be extensively exposed to the UV light. Due to the scattering members 660, the blue-phase LC layer 130 receives a more extensive UV exposure, so that the blue-phase LC layer 130 can be uniformly exposed to the UV light for the LC curing treatment. Each scattering member 660 can have a cross-sectional shape of semi-circle, triangle or polygon; but it is not limited thereto, the scattering members 660 can be shaped and patterned in the other proper manner. FIG. 6A shows an exemplary design for the scattering members 660. In another embodiment, if a UV light source is disposed above the LC panel 600, the UV light can enter downwards from the second substrate 120 into the blue-phase LC layer 130. As shown in FIG. 6B, the scattering members 660 reflect or scatter the UV light which has passed through the blue-phase LC layer 130, so that the blue-phase LC layer 130 can be extensively exposed to the UV light for the LC curing treatment. The scattering members 660 can be properly shaped according to the shape and size of the electrodes 114 and the distance between each two electrodes 114.

Figure 7:
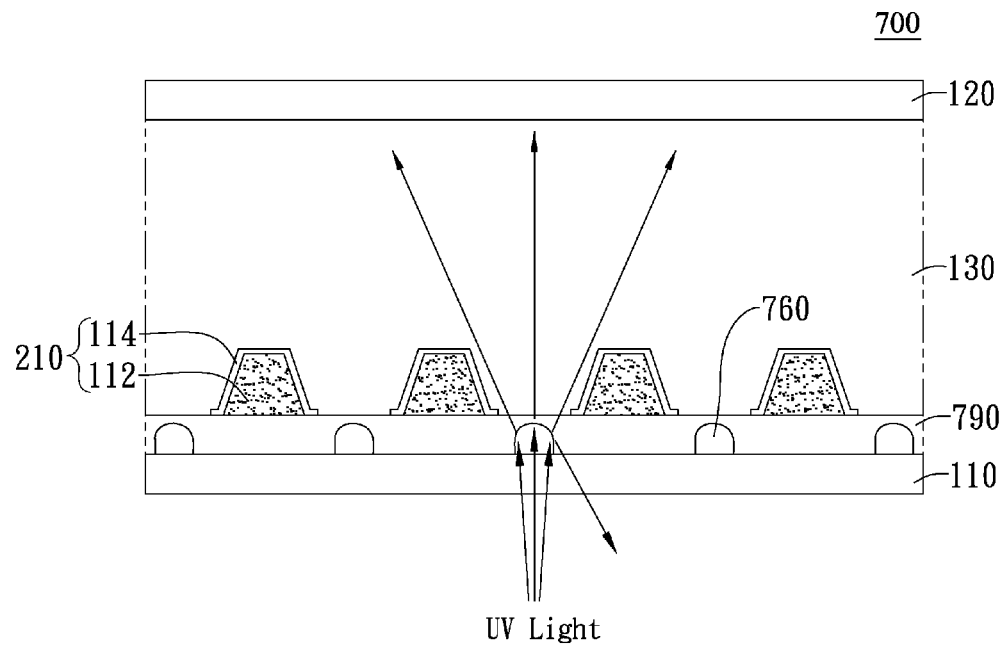
FIG. 7 schematically shows a cross-sectional view of a blue-phase LC panel according to a sixth example of the embodiment.

FIG. 7 schematically shows a cross-sectional view of a blue-phase LC panel 700 according to a sixth example of the embodiment. The LC panel 700 includes a plurality of scattering members 760 other than the LC panel 100 in FIG. 1. The scattering members 760 are disposed between the protrusion electrode 210 and the first substrate 110. They can be identical to the scattering members 660 of the fifth example but at different locations. As shown in FIG. 7, the scattering members 760 are disposed in a surface layer 790 on the first substrate 110 and located in the intermediate area between the neighboring protrusion electrodes 210. In other words, an alternate arrangement of one protrusion electrode 210 by one scattering member 760 is formed in the surface layer 790 on the first substrate 110. The refractive index of the scattering member 760 is different from that of the surface layer 790, so as to realize the above-mentioned deflecting structure. The scattering members 760 can deflect or scatter an incident UV light. The surface layer 790 can be made of a transparent insulator material. Thereby, if a UV light source is disposed under the LC panel 700, the UV light can enter upwards from the first substrate 110 into the LC panel 700. The scattering members 760 deflect or scatter the incident UV light into the blue-phase LC layer 130, so that the blue-phase LC layer 130 can be extensively exposed to the UV light. Due to the scattering members 760, the blue-phase LC layer 130 receives a more extensive UV exposure, so that the blue-phase LC layer 130 can be uniformly exposed to the UV light for the LC curing treatment. Each scattering member 760 can have a cross-sectional shape of semi-circle, triangle or polygon; but it is not limited thereto, the scattering members 760 can be shaped and patterned in the other proper manner. FIG. 7 shows an exemplary design for the scattering members 760.

Figure 8:
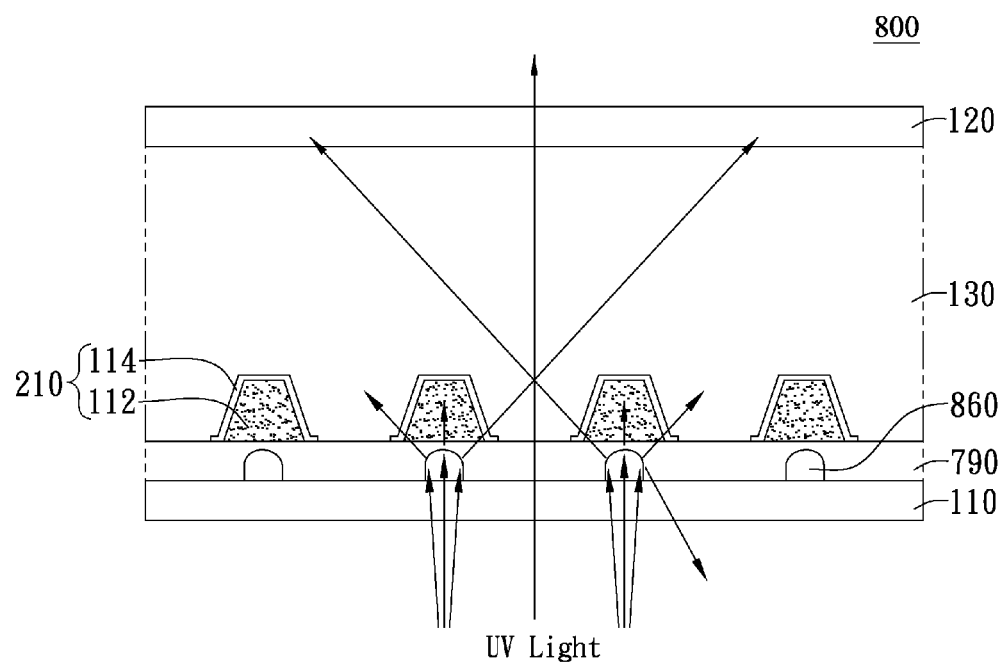
FIG. 8 schematically shows a cross-sectional view of a blue-phase LC panel according to a seventh example of the embodiment.

FIG. 8 schematically shows a cross-sectional view of a blue-phase LC panel 800 according to a seventh example of the embodiment. The LC panel 800 includes a plurality of scattering members 860 other than the LC panel 100 in FIG. 1. As shown in FIG. 8, the scattering members 860 are disposed between the protrusion electrode 210 and the first substrate 110. They can be identical to the scattering members 760 of the sixth example but at different locations. Due to such an arrangement, the refractive index difference between the scattering member 860 and the surface layer 790 can be increased, or the scattering mechanism in the LC panel 800 can be changed, so as to realize the above-mentioned deflecting structure. The scattering members 860 can deflect or scatter an incident UV light, with a larger deflection angle than that of the scattering member 760. Due to the scattering members 860, the blue-phase LC layer 130 receives a more extensive UV exposure, so that the blue-phase LC layer 130 can be uniformly exposed to the UV light for the LC curing treatment. Each scattering member 860 can have a cross-sectional shape of semi-circle, triangle or polygon; but it is not limited thereto, the scattering members 860 can be shaped and patterned in the other proper manner. FIG. 8 shows an exemplary design for the scattering members 860, in which the scattering member 860 is a micro-structure caused by a refractive-index difference between the scattering member 860 and the surface layer 790.

Figure 9:
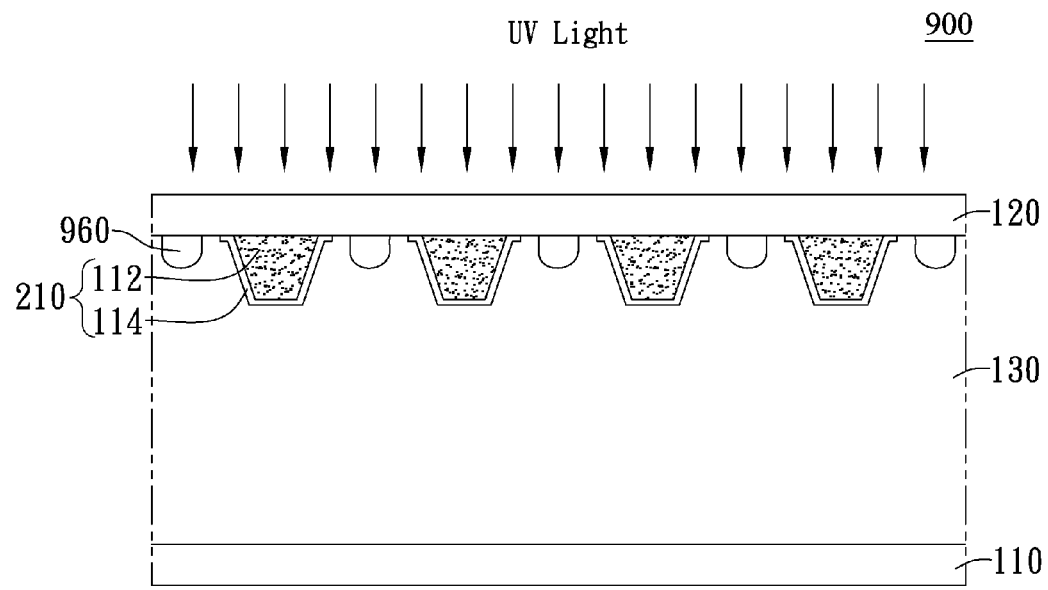
FIG. 9 schematically shows a cross-sectional view of a blue-phase LC panel according to another embodiment of the present disclosure.

FIG. 9 schematically shows a cross-sectional view of a blue-phase LC panel 900 according to another embodiment of the present disclosure. A plurality of protrusion electrodes 210, each including a protrusion 112 and an electrode 114, are formed on the second substrate 120. As shown in FIG. 9, a UV light source may be disposed above the LC panel 900, and the UV light enters downwards from the second substrate 120 into the blue-phase LC layer 130. It can be understood that the as-described examples of FIGS. 2 to 8 can be applied to the UV exposure of the LC panel 900, which has its protrusion electrode 210 on the second substrate 120. The deflection structure 960 can be disposed at a proper location in the LC panel 900 in the form of micro-structures or scattering members. Otherwise, the deflection structure 960 can be designed in the form of a reflection layer or a diffusion film, according to the above-recited first to seventh examples. The protrusion electrode 210 can be formed on the first substrate 110 or on the second substrate 120. In this disclosure, what applied to a LC panel with its protrusion electrodes 210 on its lower glass plate is also applicable to a LC panel with its protrusion electrodes 210 on its upper glass plate.

Figure 10:
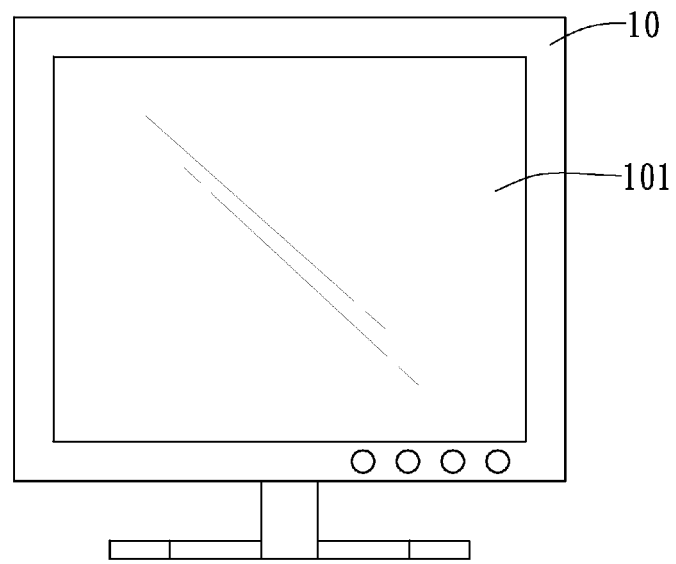
FIG. 10 schematically shows a LC display apparatus according to an embodiment of this disclosure.

FIG. 10 schematically shows a LC display apparatus 10 according to an embodiment of this disclosure. The LC display apparatus 10 includes a LC panel 101 according to the foregoing embodiments. The LC display apparatus 10 can be a calculator with a monitoring screen, a mobile phone, a tablet computer, or a digital media frame, but this disclosure is not limited thereto. The configuration of the LC panel 101 can be referred to the above-described embodiments. Liquid crystals (LCs) are matter in a state that has properties between those of conventional liquid and those of solid crystal. LCs may be composed of crystal-like organic molecules, which can be orientated according to external electrical fields. This is the operational principle of the LC display.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A liquid crystal (LC) panel comprising:
  a first substrate having a plurality of protrusion electrodes formed thereon;
  a second substrate disposed on the first substrate;
  a LC layer interposed between the first and second substrates; and
  a deflecting structure disposed between the first and second substrates and configured for changing optical paths of ultraviolet (UV) light;
  wherein the UV light passes through the areas between the neighboring protrusion electrodes, and the deflecting structure is located in the optical paths of the UV light; and
  wherein the deflecting structure comprises a plurality of scattering members formed on the first substrate, each scattering member located in the intermediate area between the neighboring protrusion electrodes.

2. The LC panel according to claim 1, wherein the LC layer comprises blue-phase liquid crystal.

3. The LC panel according to claim 1, wherein the first substrate comprises a thin-film-transistor layer, and the first substrate or the second substrate comprises a color-filter layer.

4. The LC panel according to claim 1, wherein the deflecting structure comprises a diffusion film formed between the first substrate and the plurality of protrusion electrodes, configured for diffusing the UV light before it passes through the plurality of protrusion electrodes.

5. The LC panel according to claim 1, wherein the deflecting structure comprises a plurality of scattering members formed between the first substrate and the plurality of protrusion electrodes, each scattering member located in the area between the neighboring protrusion electrodes.

6. A liquid crystal (LC) display apparatus comprising a LC panel which comprises:
  a first substrate having a plurality of protrusion electrodes formed thereon;
  a second substrate disposed on the first substrate;
  a LC layer interposed between the first and second substrates; and
  a deflecting structure disposed between the first and second substrates and configured for changing optical paths of UV light;
  wherein the UV light passes through the areas between the neighboring protrusion electrodes, and the deflecting structure is located in the optical paths of the UV light; and wherein the deflecting structure comprises a plurality of scattering members formed between the first substrate and the plurality of protrusion electrodes, each scattering member located in the area between the neighboring protrusion electrodes or under one of the plurality of protrusion electrodes.

7. A method for spreading UV exposure in a LC panel for LC curing treatment, the method comprising:
providing a LC panel which comprises a first substrate with a plurality of protrusion electrodes formed thereon, a second substrate disposed on the first substrate, and a LC layer interposed between the first and second substrates;
exposing the LC panel to UV light which is disposed under the first substrate and travels upwards; and
providing a deflecting structure disposed between the first and second substrates and configured for changing optical paths of ultraviolet (UV) light;
wherein the UV light passes through the areas between the neighboring protrusion electrodes, and the deflecting structure is located in the optical paths of the UV light; and
wherein the deflecting structure comprises a plurality of scattering members formed on the first substrate, each scattering member located in the intermediate area between the neighboring protrusion electrodes.

8. The method according to claim 7, wherein the LC layer comprises blue-phase liquid crystal.

9. The method according to claim 7, wherein the first substrate comprises a thin-film-transistor layer, and the first substrate or the second substrate comprises a color-filter layer.

10. The method according to claim 7, wherein the step of changing optical paths of the UV light comprises:
reflecting the UV light which has passed through the LC panel back to the LC panel.

11. The method according to claim 10 wherein the step of changing optical paths of the UV light further comprises:
scattering the reflected UV light before it enters into the LC panel again.

12. The method according to claim 7, wherein the step of changing optical paths of the UV light comprises:
scattering the exposing UV light before it enters into the LC layer again.

* * * * *